United States Patent
Vida Marques (10) Patent No.: US 7,766,601 B2
(45) Date of Patent: Aug. 3, 2010

(54) VERTICAL-AXIS WIND TURBINE

(75) Inventor: Firmiliano M. Vida Marques, Esch sur Alzette (LU)

(73) Assignee: Vimak, Marckolsheim (FR)

( * ) Notice: Subject to any disclaimer, the term of this patent is extended or adjusted under 35 U.S.C. 154(b) by 221 days.

(21) Appl. No.: 11/631,299

(22) PCT Filed: Jul. 1, 2005

(86) PCT No.: PCT/FR2005/001705

§ 371 (c)(1),
(2), (4) Date: Apr. 16, 2007

(87) PCT Pub. No.: WO2006/013273

PCT Pub. Date: Feb. 9, 2006

(65) Prior Publication Data

US 2007/0257494 A1  Nov. 8, 2007

(30) Foreign Application Priority Data

Jul. 2, 2004 (FR) .................................. 04 07406

(51) Int. Cl.
*F03D 3/02* (2006.01)
(52) U.S. Cl. ........................... 415/4.2; 415/4.4; 415/17; 415/48; 416/17; 416/37; 416/40
(58) Field of Classification Search ....... 415/1, 415/4.2, 4.4, 17, 48; 416/17, 37, 40, 61, 416/87, 88, 89, 101, 111, 119, 131, 197 A
See application file for complete search history.

(56) References Cited

U.S. PATENT DOCUMENTS

| | | | | |
|---|---|---|---|---|
| 1,315,595 | A | * | 9/1919 | Clark .......................... 415/4.4 |
| 4,362,470 | A | * | 12/1982 | Locastro et al. ......... 416/197 A |
| 4,365,934 | A | | 12/1982 | Mason |
| 4,410,806 | A | | 10/1983 | Brulle |
| 4,424,796 | A | * | 1/1984 | Fish ............................ 126/247 |
| 5,083,901 | A | | 1/1992 | Griffin, Jr. et al. |
| 6,379,115 | B1 | | 4/2002 | Hirai |
| 6,505,785 | B2 | * | 1/2003 | Willis et al. ................... 290/55 |
| 6,655,916 | B2 | * | 12/2003 | Ramisa Navarro .......... 416/117 |
| 2002/0095878 | A1 | * | 7/2002 | Henderson ................... 52/116 |
| 2002/0105190 | A1 | | 8/2002 | Thomas |

FOREIGN PATENT DOCUMENTS

| | | |
|---|---|---|
| DE | 195 44 400 A | 6/1997 |
| DE | 100 54 700 A1 | 5/2001 |
| GB | 2 356 431 A | 5/2001 |

* cited by examiner

*Primary Examiner*—Igor Kershteyn
(74) *Attorney, Agent, or Firm*—Oliff & Berridge, PLC (57) ABSTRACT

A vertical-axis wind turbine which has a central rotary tower upon which are fixed substantially vertical blades. The blades are capable of rotating and moving radially relative to the central tower, the movement of each blade being independently controlled based on the conditions to which it is constantly subjected so as to optimize the overall performance of the wind turbine.

27 Claims, 5 Drawing Sheets

VERTICAL-AXIS WIND TURBINE

BACKGROUND

1. Field of Invention

The present invention relates to a vertical-axis wind turbine having a design which has been optimized so that it can work in practically any weather conditions, also with increased performance, which makes it possible to substantially reduce the cost of energy. The logic followed by the designers also makes it possible to achieve an extremely reliable configuration, finally offering construction and maintenance possibilities new to this type of system.

According to the invention, the wind turbine traditionally includes a central rotary tower whereto are fixed blades, and is essentially characterized in that said blades are capable of rotating and moving radially relative to the central tower, the movement of each blade being independently controlled and commanded based on the conditions to which it is constantly subjected so as to optimize the overall performance of the wind turbine. This characteristic, which is at the base of the system of the invention, must enable the wind turbine to operate in most meteorological conditions.

2. Description of Related Art

In some documents, such as U.S. Pat. No. 6,370,915 and patent DE-195 44 400, mention is made of wind turbines where the angular position of the blades is managed by a computer. However, in both of these cases, the angular position of each blade is planned in advance by a program according to a restricted number of models which account for the wind force, and the blades are therefore not constantly managed completely independently.

SUMMARY

The structure of the invention offers several degrees of freedom in adjusting the blades; this freedom allows optimal positioning of these blades, particularly relative to the wind, independently from one another, thereby ensuring an operating performance which is always high and making it possible, as needed, to position the blades in a very folded manner when the winds reach extremely significant speeds, for example in the case of a storm. In this case, the position of the blades no longer offers dynamic wind capturing, and the wind turbine stops for safety reasons.

More specifically, at least one end of each rotating shaft of the blades is radially slideable relative to the central tower. In the case where only one of the ends of each shaft is radially mobile, this is preferably the lower end.

It is, however, possible for the two ends of each rotating shaft of the blades to be radially mobile independently of one another. The choice of uniqueness or doubling the possibility of radial movement depends on the application, the region where the wind turbine will be set up, etc.

From a practical viewpoint, this possibility of radial movement results from linking the ends of the rotating shafts of the blades to arms which develop radially from the central rotary tower. More specifically, these arms are equipped with chutes which develop according to the arms' axis.

Unlike current wind turbines, the blades of the invention consequently and in all cases have two fixing points, which makes it possible to build them with a much larger surface and to obtain significantly greater power, in particular when the wind conditions are favorable.

In a first embodiment of the invention, the blades are rigid. They are therefore traditionally manufactured with materials providing surfaces which keep their shape when faced with wind.

According to one possible configuration, the transversal section of the blades is in the shape of an elongated S.

The resulting curved exterior surface again has the goal of optimizing wind impact on each blade while enabling better management of air flows and their turbulences near the surfaces. Guiding of said flows toward the external edge of each blade is improved by this shape, resulting in decreased turbulences and better application of wind force. Moreover, this S-shape makes it possible to increase the aerodynamic performance of the blades in motion.

According to an additional possibility, the blades may be composed of several assemblable parts. The objective is to enable easier transport and easier on-site assembly for blades which may reach very large dimensions.

According to a second possible embodiment of the invention, the blades may be made of a flexible material, for example used for sails.

Beyond a very favorable economic impact, since this type of blade has a much lower production cost than rigid blades, these blades may be used in fields in which they can have a dual function: for example, in the case of use on a ship or sailboat, by keeping the blades in a fixed position, they may have the same functions as a sail on a sailboat.

In this case, a wind turbine with flexible blades installed on a ship could act as a generator to power a ship motor when navigation by sail is impossible, or as a traditional sail when use of the motor is not required.

In this configuration, the blades can be rolled in or around a lower support and deployed with the help of cables working with an upper support. In other terms, each blade can be retracted by rolling.

To avoid vibrations, particularly when the sail flaps, at least the upper support is equipped with a damper device.

Whether in the variation with rigid blades or in the version with flexible blades, the longitudinal section of the blades may be in the shape of a trapezium. In the case of sails, particularly but not exclusively, the base of the sail is therefore longer at its upper edge.

Even if the surface of the blades is large, it must be possible to correctly and rapidly direct them at any moment according to the winds in order to optimize the system's performance, or retract them when storm conditions arise. This must moreover be able to be done as quickly as possible through constant measuring of the meteorological parameters and immediate repercussion of said measurements to the effective position of the blades. This is the reason for which the radial position of the rotating shafts of the blades as well as their angular position are preferably managed by at least one computer whereto are linked sensors of the meteorological parameters of the wind turbine's environment, said computers managing the motor means driving the blades. This characteristic, although not strictly necessary, is nevertheless essential in numerous applications.

The computer, which calculates in particular the rotary movement of each blade, can accelerate or slow it to optimize its position with regard to the wind conditions in order to improve the overall performance of the wind turbine.

In this way, each blade will constantly be in the optimal position to capture the wind.

The parameters taken into account by the computer(s) are, in particular, the:

speed and direction of the wind, measured by a weather vane and a wind gage;

position of the blades;

speed and energy consumption of the wind turbine;

consumption of the blades;

atmospheric temperature, and that of the wind turbine components.

These different parameters depend in particular on the number and nature of the sensors installed, actuators which enable the implementation of the computer program, as well as the software which makes the unit run. In this respect, it should be noted that the computer(s) may be parameterized by an external computer, in particular to change certain data, or even overall to improve or update the management software.

Among the actuators, the motor means mentioned are preferably electric motors.

All in all, the movement of each blade is controlled by computer, with the help of one or several software programs designed to put the physical elements of the system, namely in particular the structure and sizing of the blades and more generally of the wind turbine, in communication with the meteorological parameters measured. The position of the blades is in this case permanently subjugated to the meteorological and climatic conditions, the system's response to the values measured taking place almost immediately.

When the wind speed increases suddenly, for example, the blades are moved by the system to bring them closer to the rotary tower, and oriented such that they do not offer their entire surface to the efforts exerted by the wind. Inversely, in the case where the wind weakens, the blades fan out to present a more significant surface and to enable energy production in optimal conditions.

Having control of both the angular and radial position of each blade constantly and independently of one another relative to the central tower, according to determined climatic parameters, makes it possible to obtain maximal system performance, and consequently to produce the greatest possible amount of energy at each moment.

According to one possibility, the sensors are placed above the blades, meaning in the zone where the measurements, in particular of speed and wind strength, are the most significant.

Moreover, these sensors, and in general all of the measurement devices, are not disturbed in any way by the passage of the blades.

Furthermore, the structure of the wind turbine of the invention is such that the devices for transforming energy, and in particular the electrical generator, are disposed at the level of the wind turbine's base, under the central rotary tower.

This configuration is particularly advantageous, in particular with regard to structures existing today, because it makes it possible to obtain excellent stability of the wind turbine and strongly decreases the risks in case of accident. The manufacturing and maintenance of the wind turbine are also greatly facilitated by this layout.

In current wind turbines, the electrical generator and all the related equipment are generally disposed in the upper part of the pole, close to the blades. This is in particular the case for wind turbines with horizontal blades. Given the power offered and the corresponding size of wind turbines installed in particular in Nordic countries, it is easy to imagine both the manufacturing and maintenance difficulties as well as all the risks related to their set-up, directly related to such a configuration. Transporting and building a high-power generator several dozen meters from the ground, for example, is no small task.

According to the invention, the rotary tower of the wind turbine surrounds a fixed tower, which is preferably topped with an upper cabin and equipped with means for accessing said cabin.

Indeed, these means for accessing the cabin consist for example of a staircase and/or elevator.

This cabin can, for example, be used for signaling and for implementation of various measurement devices. With regard to its predecessors, the wind turbine of the invention therefore includes, in its upper part, a much lighter structure because it does not contain any of the mechanical elements needed for the production and/or transmission of energy. The upper cabin is, however, very useful because it groups the measurement instruments together, it can enable control from the top of the structure, etc. . . .

Preferably, according to the invention, the fixed pole is made up of telescopic elements. This makes it possible to transport, in just one operation, the entire interior pole of the wind turbine. In the case of high-power wind turbines, this possibility is extremely interesting because of the size of the elements to be moved. The trailer used for transport may erect the pole on the installation site following the principle used today by the trucks which deliver cement or plaster silos to worksites.

Another truck may also be equipped with a mobile hydraulic system which will be positioned, in the work phase, in the fixed pole, and will enable its erection. Once this has been done, the hydraulic system will be reloaded onto the truck and ready to be used on another worksite.

The central pole, once erected and definitively fixed, will itself serve as a crane to mount the exterior pole and various elements. This mounting principle makes it possible to avoid using enormous cranes as is the case today for the assembly of wind turbines in northern European countries, which will of course lead to substantial savings.

According to an additional possibility, the rotary pole is made up of light or openwork elements, which makes it possible to decrease its weight, the goal, however, being to keep maximum torsion resistance.

The wind turbine of the invention may also be fastened the ground using braces, which are preferably fixed to said cabin. This bracing is made possible by the particular structure of the invention and in particular its retractable vertical-bearing blades, whereas it was previously impossible to implement this in traditional wind turbines without causing positional interference with the blades. The existence of such a brace makes it possible to consider installing wind turbines according to the invention in areas where it was previously impossible to place them because of difficult climate conditions which make the very erection of the structure quite problematic.

It was previously mentioned that one of the essential advantages of the invention resides in the installation in the lower part of the windmill of all of the technical structures for producing energy, which provides, in addition to the other advantages, significantly improved stability. This coupled with the brace makes anchoring the structure very effective.

This base of the wind turbine may moreover be developed as a technical site on which a machine room and computer control room are located.

All in all, the wind turbines of the invention are really designed to work everywhere and in particular in regions beset with extreme meteorological conditions, in places which were off limits to them until now, all while offering very high technical reliability. To achieve this, according to one fundamental characteristic, the structure of the invention rests on constant optimal positioning of each blade relative to the wind, which makes it possible to permanently produce maximal energy according to external conditions. The configuration of the invention consequently procures, over the long-term, an undeniable economic advantage, because the cost of producing said energy is lower than for the various already-existing systems.

The wind turbines of the invention also allow a large number of variations, according to the installation areas and resulting constraints. Despite this, their construction costs are lower than those which may be expected in the framework of building traditional wind turbines. The possibility of installing the wind turbines of the invention in previously-inaccessible areas was mentioned: beyond the problem of extreme meteorological conditions, certain areas are currently off-limits because traditional wind turbines cause noise pollution, incompatible with human neighborhoods.

In the case in point, the invention provides substantially greater acoustic comfort than the latter due to the particular configuration of the blades and their permanent adaptability to the wind. From this perspective, the system of the invention may moreover be similar to the sails of a boat, for which one also looks for constant adaptation of the position to the direction of the wind.

For reasons of mechanical resistance, traditional wind turbines cannot be installed in very cold areas either, since the speed of blade rotation in relation to the main axis of the wind turbine, which is often high to offset the low performance, causes cooling of the pieces and, sometimes, the formation of blocks of ice, in particular at the end of the blades, which can be extremely dangerous. This is a particularly significant danger for systems with horizontal blades.

In the invention, the speed of rotation is generally much lower for a significantly greater production of power. The result is less cooling of the various pieces in motion, which also decreases the risk of such blocks of ice forming. The vertical structure also decreases the risk of ice blocks forming.

BRIEF DESCRIPTION OF THE DRAWINGS

The invention will now be described in more detail, in reference to the appended figures, for which.

DETAILED DESCRIPTION

Figure 1:
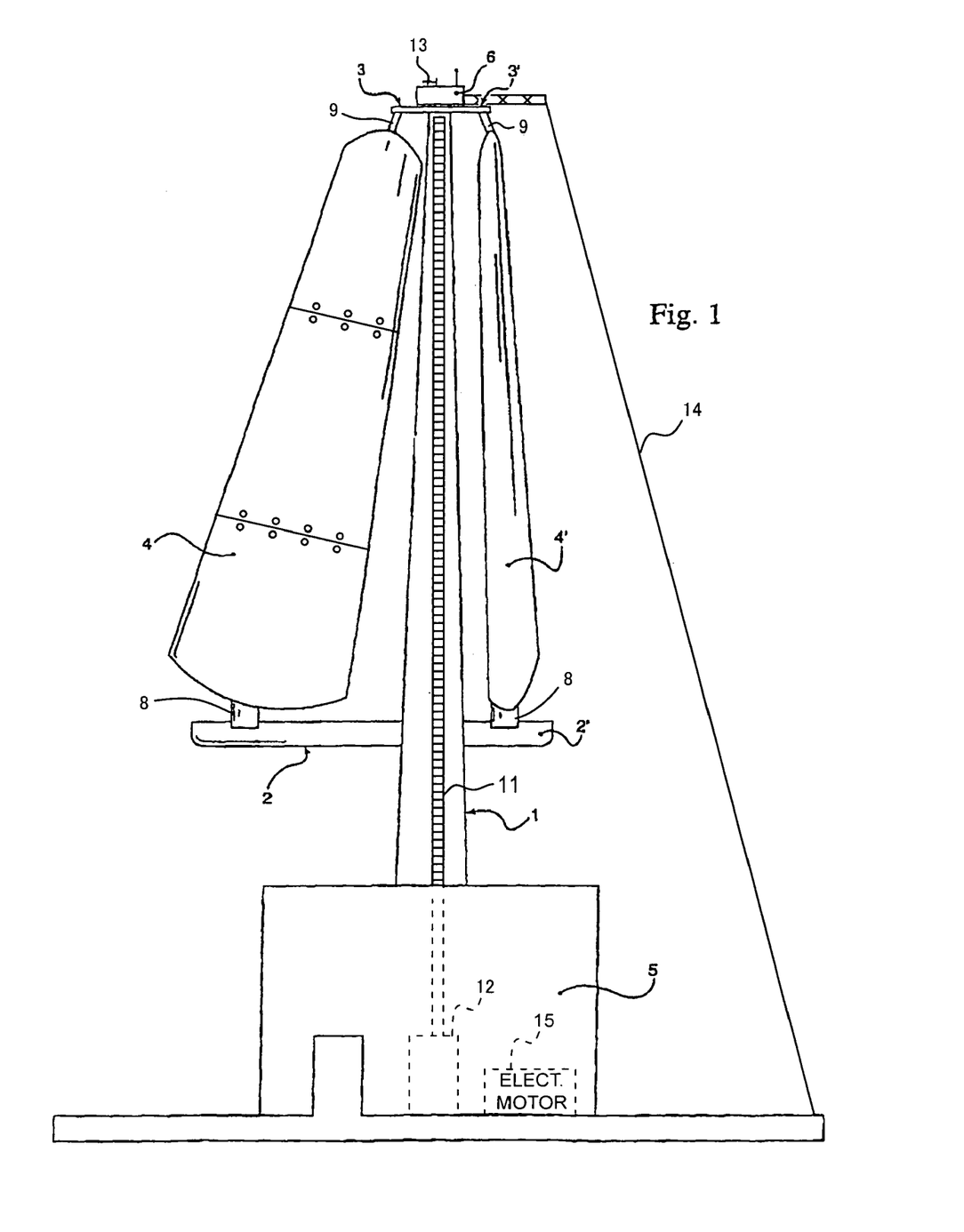
FIG. 1 shows a general top view of a wind turbine of the invention.

In reference to FIG. 1, the wind turbine of the invention essentially comprises a rotary tower (1) whereto are attached interior (2, 2') and upper (3, 3') arms supporting the blades (4, 4'). The blades (4) may be made up of several assemblable pieces as shown. The mechanical link between said blades (4, 4') and the arms, upper (3, 3') and lower (2, 2') respectively, is such that they can on one hand rotate around a central axis, and on the other hand radially move closer to or farther from the central tower (1), as will be shown in more detail in reference to the following figures. The central tower (1) is disposed on a technical site (5), wherein is essentially installed the equipment for producing energy such as the generator (15) and the related equipment. This site (5) may also include devices for storing said energy, as well as a control room, means for transforming energy, etc.

A cabin (6) is disposed at upper part of the pole. This upper cabin is topped and/or equipped with air signaling means, sensors and devices for measuring surrounding climatic and meteorological parameters, which are then retransmitted using computer means which determine the precise individual positions of the poles (4, 4'). These devices, for example wind gages (13), serve especially to measure the speed, direction and strength of winds. If needed, braces (14) making it possible to strengthen the fixing of the wind turbine to the ground are attached to said cabin (6).

The central tower (1), which is rotary because it supports the arms (2, 2') and (3, 3'), surrounds a fixed pole equipped with means for accessing the cabin (6) such as stairs (11) or elevator (12). It drives, of course, the electricity generator (15) disposed in the technical site (5), in which all of the systems for controlling the wind turbine are also located. In practice, most of the operations related to the daily operation of the wind turbine of the invention take place in this site (5), contrary to what takes place in traditional wind turbines, where the machine room is located in the upper part close to the generator, machines and control bodies, resulting in the multiple practical difficulties mentioned previously.

Figure 2:
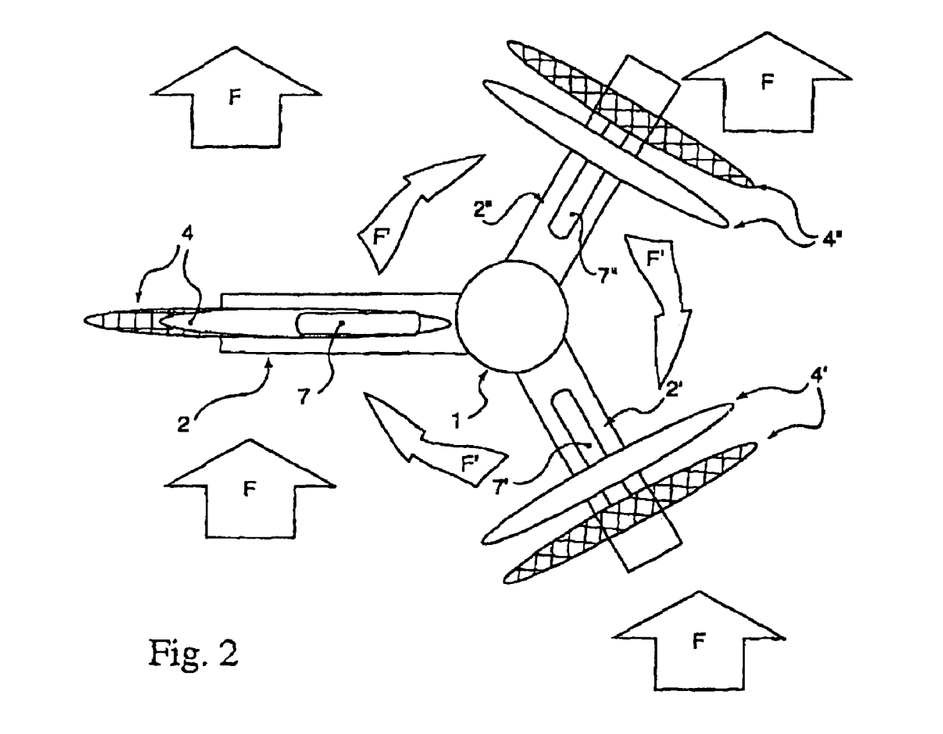
FIG. 2 diagrammatically illustrates, in cross-section, the operation of the wind turbine of the invention for a given angular position of each blade, and for two distinct radial positions with regard to the rotary pole.

The cross-section appearing in FIG. 2 shows the lower arms (2, 2', 2") linked to the central tower (1), and two distinct radial positions of the blades (4, 4', 4') with regard to said arms (2, 2', 2"). The direction of the wind is symbolized by the arrows F, while the direction of rotation of the wind turbine is illustrated by the arrows F'. In this illustration, the blades (4, 4', 4') are in their normal working position, meaning that they are positioned so as to constantly offer maximal use of wind for optimal performance. Thus, the blade (4) is disposed perpendicular to the wind, while the blades (4', 4') are positioned such that the result of forces linked to the wind have a tangential component which favors rotation of the rotary tower (1) of the wind turbine.

In the angular position shown, which is a position of maximal efficiency relative to the direction of the wind, the blades (4) can be moved radially, for example by sliding in chutes (7, 7', 7") as symbolized by the existence of two different positions of the blades (4, 4', 4"). The position of the blades (4, 4', 4") is managed by computer, and they are consequently always positioned to obtain maximal performance. The blades (4) may have a traverse section in the shape of an elongated S as shown in FIG. 3.

Figure 3:
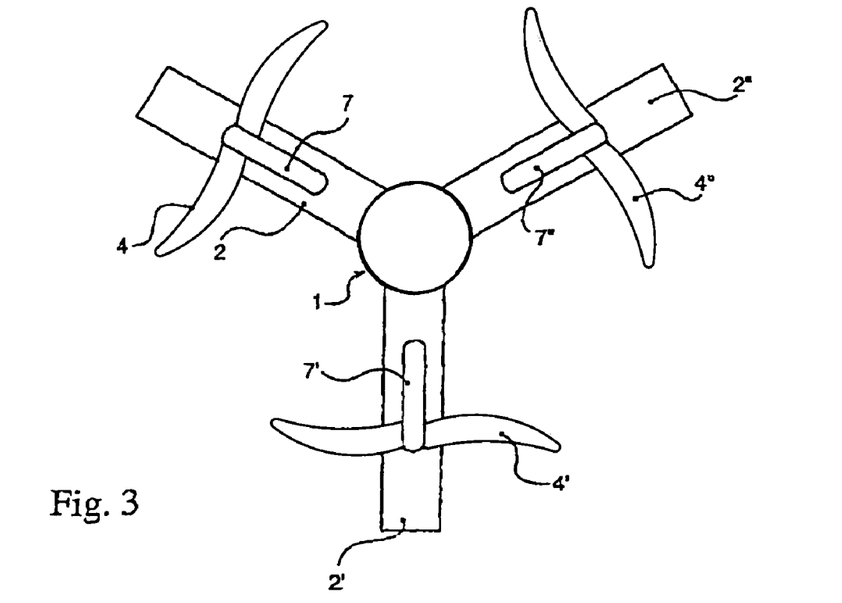
FIG. 3 shows, still in cross-section, another angular position of the blades, which precedes, in particular, regrouping toward the central pole in case of storm.
Figure 4:
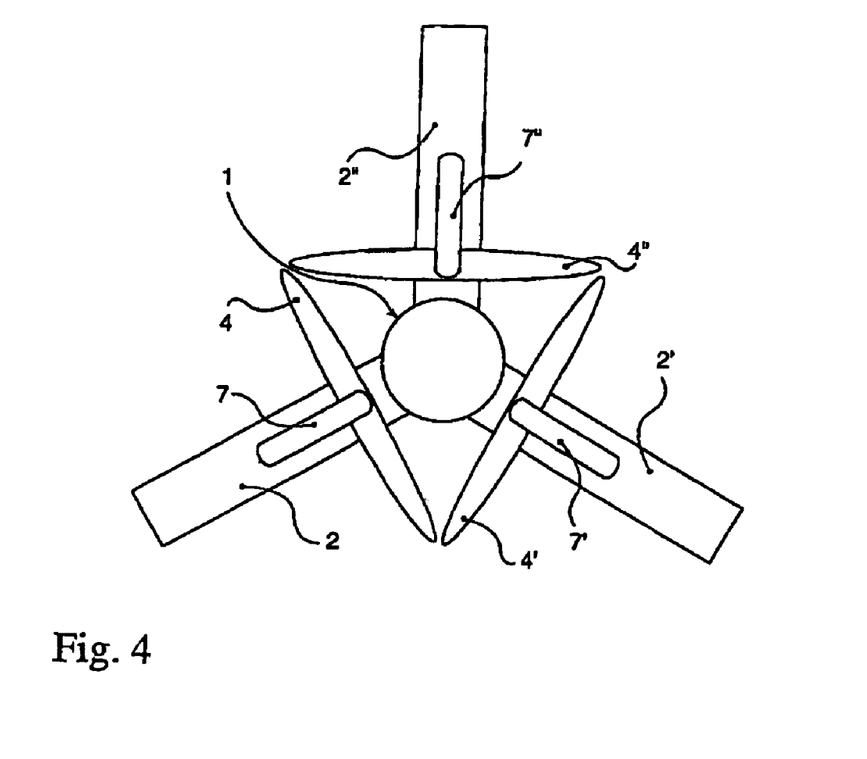
FIG. 4 illustrates said grouping, which gives the wind turbine maximal stability in case of very strong winds.

In FIG. 3, the angular position of the blades (4, 4', 4') is no longer a position for maximal performance but a preparation for retraction when the wind force reaches the technical limits for the system's operation. The wind turbine no longer rotates only by its own inertia, and is practically no longer driven by the blades (4, 4', 4'). At the extreme, when storm meteorological conditions risk destroying the entire system, the blades (4, 4', 4') are folded in as shown in FIG. 4, and form a "pyramid" which provides maximum security for the object. Indeed, the adjacent position of the lateral ends of each blade (4, 4', 4') is made possible by the radial sliding of each of these blades in the direction of the central rotary tower (1). It should be noted that the chutes (7, 7', 7") are therefore calculated such that their lower end (close to the rotary tower) is located at a distance from said tower (1) such that adjacency of the lateral sides is possible, preferably without contact.

Figure 5:
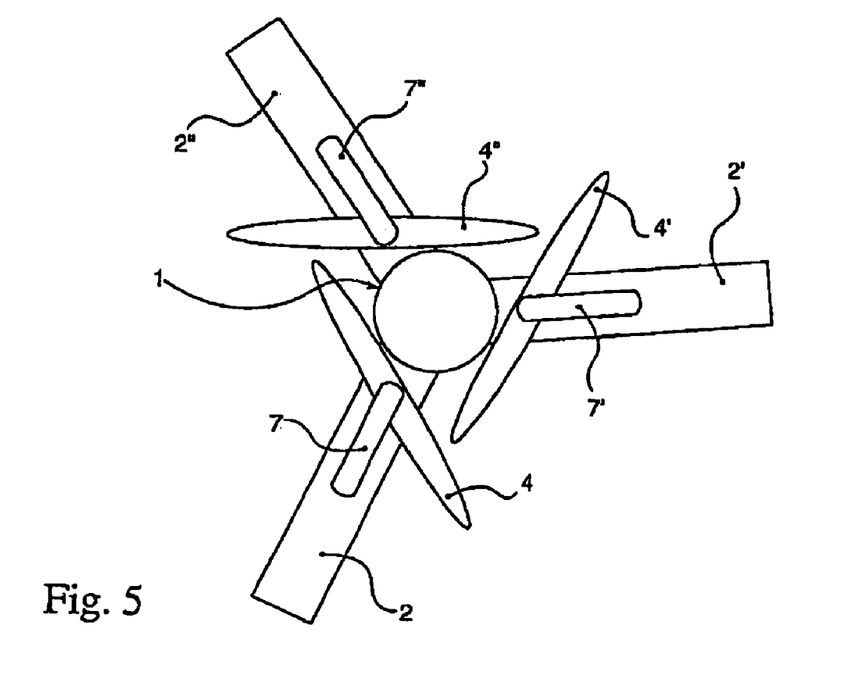
FIG. 5 illustrates a possible position of the blades during violent winds but allowing operation of the wind turbine.

FIG. 5 shows that even in this position, it is possible to pivot the blades (4, 4', 4") slightly such that only a fraction of their surface can catch the wind. This type of operation is consequently indicated when the winds are very violent but allow use of the wind turbine without damage.

Many applications are possible for this type of wind turbine. The shape of the blades (4, 4', 4"), the length of the rotary tower (1), etc. . . . must therefore be adapted to the environments in which the wind turbines of the invention are set up. Depending on the temperatures, the average speed of winds observed on the site, etc. . . . , these blades will be more or less high, large, etc.

Figure 6:
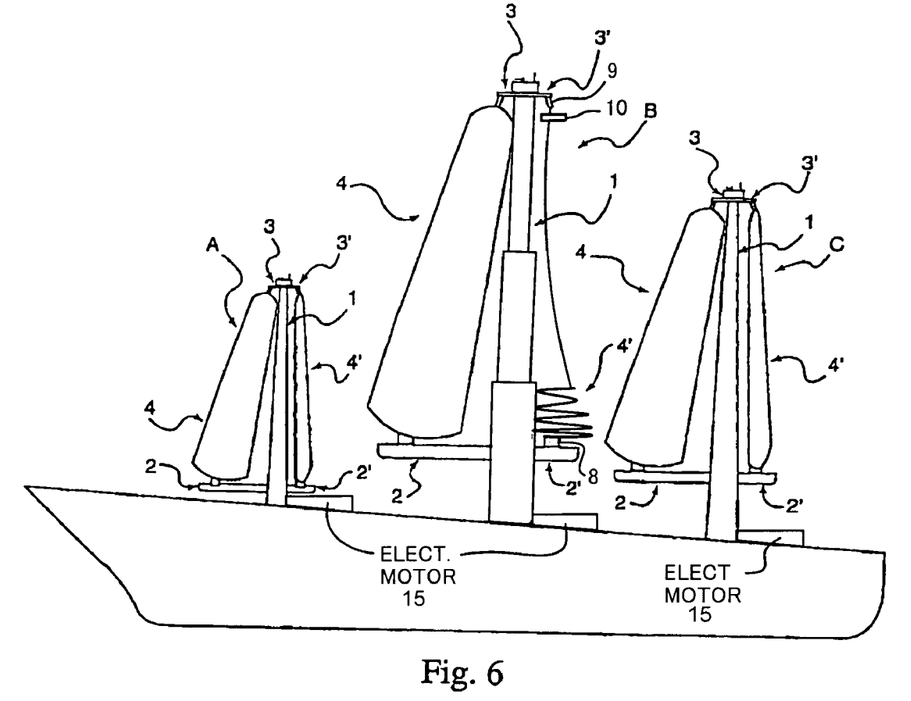
FIG. 6 illustrates one possible application of the invention on a boat.

In the configuration of FIG. 6, three wind turbines according to the invention (A, B, C) are assembled on a boat in the place of traditional masts. In this context, the blades (4, 4', 4") replace the sails. The blades (4) may be made of a flexible sail material. Also, the blades (4) may be rolled in or around a lower support (8) and deployed with the help of cables working with an upper support (9). A damping device (10) may be provided. The boat is propelled by an electric motor powered by the generators located at the base of each of the wind turbines (A, B, C). These are traditionally controlled by computer(s) which use(s) information obtained by the sensors to position each blade, individually, in the best way, in order to optimize system performance.

Such an application may for example be applied to barges operating at sea in order to obtain current with considerably less costly facilities than the current field of wind turbines.

The possibility of various sizes for the wind turbine according to the invention, depending on the desired application, was previously mentioned.

Figure 7:
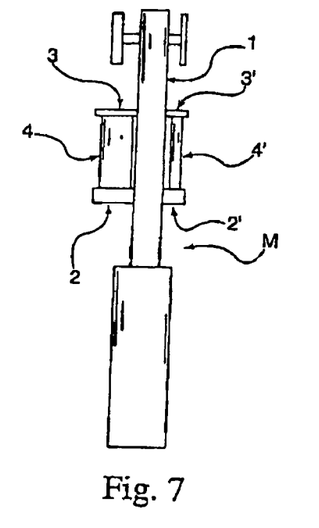
FIG. 7 shows a small-size application on antennae posts, for example cellular telephone relays.

In FIG. 7, the wind turbine is very small and may be assembled on existing posts or masts (M) such as antennae for cellular telephone relays. They then produce the necessary energy to ensure operation in case of breakdown, said energy then of course being stored in batteries to be released as needed. The current cellular telephone relay poles are already equipped with batteries, and sometimes power plants, or even a plant for transforming direct current into alternating. The installation of a wind turbine according to the invention could be perfectly integrated into this type of structure.

Figure 8:
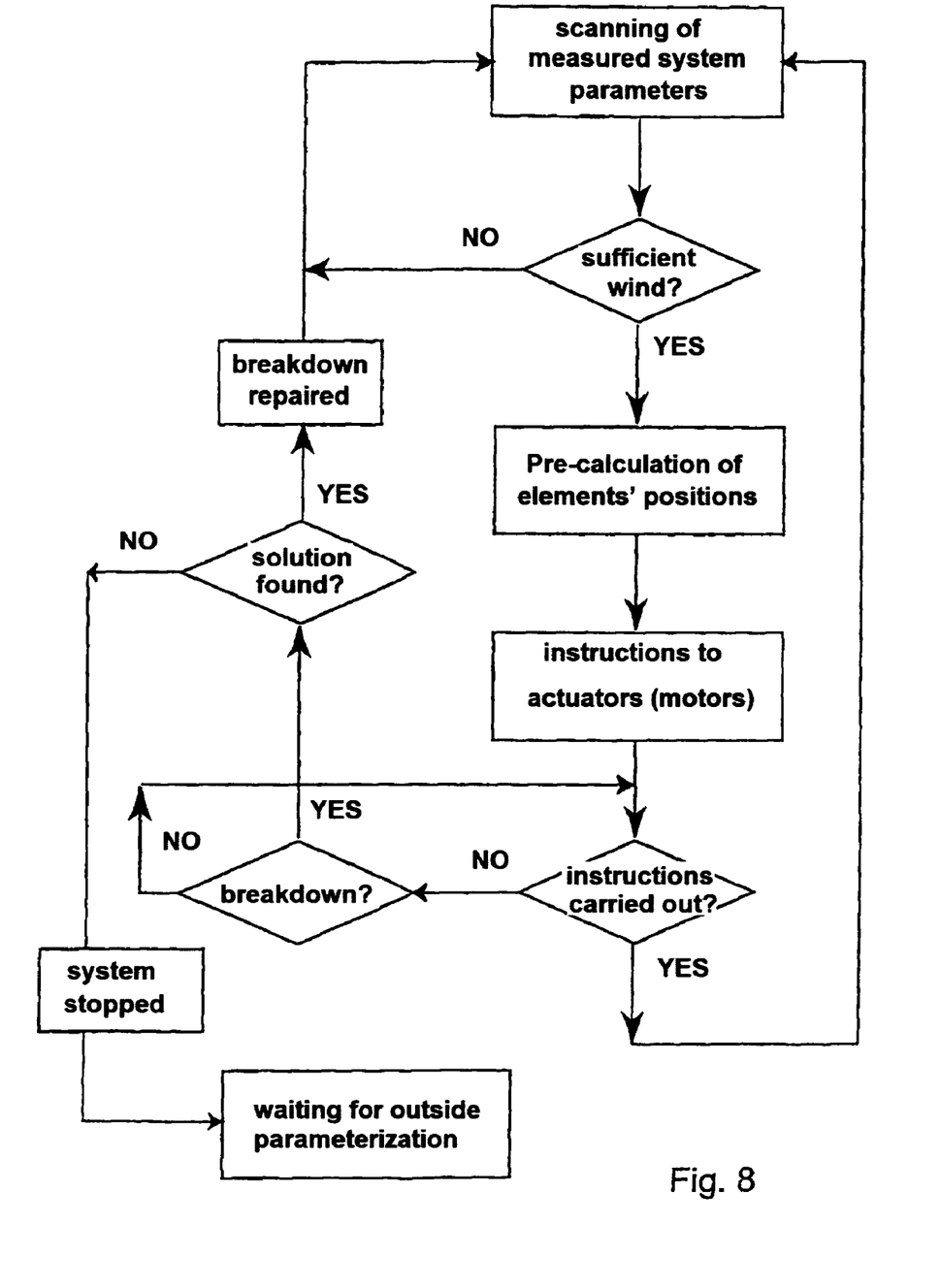
FIG. 8 shows a synoptic diagram of the overall operation of the central control computer.

FIG. 8 illustrates a very general organizational chart of the control and organization of the system, done by at least one computer. This software enables intelligent management of each wind turbine. It brings together various information such as wind speed and direction, the angular positions of each blade, rotation speed of the wind turbine, its angular position, to constantly calculate the optimal position of each blade relative to the wind. Beyond these purely technical characteristics, the computer also manages the production and consumption of energy, said consumption being considered globally and for each element of the system. Temperature also being a very important parameter, the central unit also manages the atmospheric temperature as well as that of the various parts which participate in the wind turbine.

The software includes a certain number of charts of values which are implemented using comparisons with the measured values, in order to adopt an appropriate behavior when faced with meteorological conditions.

The software program(s) integrated into each wind turbine enable(s) independent management of this unit. This management also makes it possible to plan for certain equipment failures in advance, and to detect any system anomaly from a distance. Thus, the three blades being completely independent, they can also be managed independently. In the case where a rotary motor breaks down, there will for example be two possible courses of action: the corresponding blade can remain perpendicular to the tower, and the wind turbine is then stopped and puts itself into the protective position with this blade located behind the tower relative to the wind speed. If said blade is not perpendicular to the tower, the system will bring it closer to the tower, and the wind turbine can continue to operate with two blades.

The operation of the wind turbines may also be managed remotely through the internet or other appropriate networks.

The organizational chart in FIG. 8 clearly shows that there is constant scanning of all system parameters, measured with the help of sensors or equivalent devices, and that all of the values are taken into account in order to operate the wind turbine. In case of breakdown, the system can fix itself or stop itself to wait for external assistance.

The invention claimed is:

1. Vertical-axis wind turbine comprising a central rotary tower whereto are fixed substantially vertical blades, wherein said blades are capable of rotating and moving radially relative to the central tower, the movement of each blade being independently controlled based on the conditions to which it is constantly subjected so as to optimize the overall performance of the wind turbine.

2. Vertical-axis wind turbine according to claim 1, wherein each blade has a rotating shaft with two ends, and at least one of the ends of each rotating shaft of the blades slides in a radial direction relative to the central tower.

3. Vertical-axis wind turbine according to claim 2, wherein a lower end of each rotating shaft of the blades is radially mobile.

4. Vertical-axis wind turbine according to claim 3, wherein both ends of each rotating shaft of the blades are radially mobile independently of one another.

5. Vertical-axis wind turbine according to claim 3, wherein the ends of the rotating shafts of the blades are linked to arms developing radially from the central rotary tower.

6. Vertical-axis wind turbine according to the claim 5, wherein the arms are provided with chutes.

7. Vertical-axis wind turbine according to claim 1, wherein the blades are rigid.

8. Vertical-axis wind turbine according to claim 7, wherein a transversal section of the blades is in the shape of an elongated S.

9. Vertical-axis wind turbine according to claim 7, wherein the blades are made up of several assemblable pieces.

10. Vertical-axis wind turbine according to claim 1, wherein the blades are made of a flexible sail material.

11. Vertical-axis wind turbine according to the claim 10, wherein the blades can be rolled in or around a lower support and deployed with the help of cables working with an upper support.

12. Vertical-axis wind turbine according to claim 11, wherein at least the upper support is provided with a damping device.

13. Vertical-axis wind turbine according to claim 7, wherein a longitudinal section of the blades is in the shape of a trapezium.

14. Vertical-axis wind turbine according to claim 1, wherein a position of rotating shafts of the blades relative to the central tower and an angular position of the blades are managed by at least one computer linked to sensors for meteorological parameters of the environment of the wind turbine, said computers piloting a motor driving the blades.

15. Vertical-axis wind turbine according to claim 14, wherein the computer accelerates or slows rotation of each blade to optimize blade position relative to wind conditions in order to improve performance.

16. Vertical-axis wind turbine according to claim 14, wherein the parameters taken into account by the at least one computer include:
- speed and direction of the wind, measured by a weather vane and a wind gage;
- position of the blades;
- speed and energy consumption of the wind turbine;
- consumption of the blades;
- atmospheric temperature, and temperature of wind turbine components.

17. Vertical-axis wind turbine according to claim 14, wherein the at least one computer is parameterized by an external computer.

18. Vertical-axis wind turbine according to claim 14, wherein the motor driving the blades includes one or more electric motors.

19. Vertical-axis wind turbine according to claim 14, wherein said meteorological parameter sensors are located above the blades.

20. Vertical-axis wind turbine according to claim 1, wherein an electrical generator for transforming energy, is disposed at a base level of the wind turbine, under the central rotary tower.

21. Vertical-axis wind turbine according to claim 1, wherein the rotary tower surrounds a fixed tower.

22. Vertical-axis wind turbine according to claim 21, wherein the fixed tower is topped with an upper cabin and provided with means for accessing said cabin.

23. Vertical-axis wind turbine according to claim 22, wherein the means for accessing the upper cabin includes a staircase and/or an elevator.

24. Vertical-axis wind turbine according to claim 21 wherein the fixed tower is made up of telescopic elements.

25. Vertical-axis wind turbine according to claim 1, wherein the central rotary tower is made up of light or openwork elements.

26. Vertical-axis wind turbine according to claim 1, wherein the wind turbine is fastened to the ground using braces.

27. Vertical-axis wind turbine according to claim 1, wherein a technical site is disposed at a base of the central rotary tower.

* * * * *